(12) United States Patent
Asao et al.

(10) Patent No.: US 6,335,418 B1
(45) Date of Patent: Jan. 1, 2002

(54) FUNCTIONAL POLYAMIC ACID MICROFINE PARTICLES, FUNCTIONAL POLYIMIDE MICROFINE PARTICLES, AND PROCESSES FOR THEIR PRODUCTION

(75) Inventors: Katsuya Asao, Osaka; Hitoshi Morita, Sakai; Hitoshi Onishi, Higashiosaka; Masaki Kimoto, Osaka; Yayoi Yoshioka, Sakai; Hidenori Saito, Yokohama, all of (JP)

(73) Assignees: Osaka Prefectural Government, Osaka-fu; Sumitomo Bakelite Co., Ltd., Tokyo-To, both of (JP)

( * ) Notice: Subject to any disclaimer, the term of this patent is extended or adjusted under 35 U.S.C. 154(b) by 0 days.

(21) Appl. No.: 09/640,872

(22) Filed: Aug. 18, 2000

(51) Int. Cl.⁷ .......................... C08G 73/10; C08L 79/08; C08J 3/14

(52) U.S. Cl. .................. 528/170; 528/125; 528/126; 528/128; 528/171; 528/172; 528/173; 528/174; 528/175; 528/176; 528/183; 528/188; 528/220; 528/229; 528/350; 528/351; 528/353; 528/480; 528/486; 528/491; 528/495; 528/502 D; 528/503

(58) Field of Search ................ 528/125, 126, 528/128, 171, 172, 173, 174, 175, 176, 179, 183, 188, 220, 229, 350, 351, 353, 480, 491, 486, 495, 502 D, 503

(56) References Cited

U.S. PATENT DOCUMENTS

| | | | | |
|---|---|---|---|---|
| 3,607,838 A | * | 9/1971 | Strickrodt | 528/353 |
| 4,098,800 A | | 7/1978 | Banucci et al. | 260/346.3 |
| 4,711,256 A | * | 12/1987 | Kaiser | 134/25.4 |
| 4,771,110 A | | 9/1988 | Bauman et al. | 525/131 |
| 5,057,399 A | | 10/1991 | Flaim et al. | 430/313 |
| 5,281,690 A | | 1/1994 | Flaim et al. | 528/353 |
| 5,304,626 A | * | 4/1994 | Burgess et al. | 528/353 |
| 5,328,979 A | | 7/1994 | Harris et al. | 528/353 |
| 5,338,826 A | * | 8/1994 | St. Clair et al. | 528/353 |
| 5,397,847 A | | 3/1995 | Harris et al. | 525/432 |
| 5,449,742 A | * | 9/1995 | Beuhler et al. | 528/353 |
| 5,463,016 A | | 10/1995 | Tomioka et al. | 528/353 |
| 5,466,732 A | | 11/1995 | Tomioka et al. | 524/113 |
| 5,965,687 A | | 10/1999 | Jensen | 528/86 |
| 6,005,043 A | | 12/1999 | Zhu | 524/493 |

FOREIGN PATENT DOCUMENTS

| | | |
|---|---|---|
| EP | 0 982 343 | 3/2000 |
| EP | 0 982 343 A | 3/2000 |
| JP | 61-45651 | 10/1986 |
| JP | 5-271539 | 10/1993 |
| JP | 9-302089 | 11/1997 |
| JP | 140181 | 5/1999 |
| WO | WO 90 12051 A | 10/1990 |
| WO | WO 90 12051 | 10/1990 |

OTHER PUBLICATIONS

Patent Abstracts of Japan, vol. 1997, No. 06, Jun. 30, 1997 & JP 09 054228, Feb. 25, 1997.
Chemical Daily, Mar. 14, 1997, "Producing Unifrom Polyimide Microfine Particles Having Diameter or 1μm of Less and Unaffected Heat Resistance", Tri Osaka.
European Search Report, Mailed Jan. 24, 2001 (EPO 00 30 7162).
European Search Report for corresponding European application No. EP 00 30 7162 mailed Mar. 16, 2001.

* cited by examiner

Primary Examiner—P. Hampton-Hightower
(74) Attorney, Agent, or Firm—Smith, Gambrell & Russell, LLP

(57) ABSTRACT

A primary object of the invention is to provide a production technology for functional polyamic acid microfine particles and functional polyimide microfine particles by which the particle shape, size and size distribution can be freely controlled. The invention is concerned with a process for synthesizing polyamic acid particles having functional groups at least on the surface from a tetracarboxylic anhydride and a diamine compound characterized by its comprising (a) a first step which comprises providing a tetracarboxylic anhydride and a diamine compound at least one of which has functional groups and preparing a first solution containing the tetracarboxylic anhydride and a second solution containing the diamine compound and (b) a second step which comprises mixing the first and second solutions under ultrasonic agitation to thereby precipitate polyamic acid microfine particles from the mixed solution. The invention is further concerned with a process which comprises imidating the above polyamic acid particles to provide polyimide microfine particles.

14 Claims, 13 Drawing Sheets

(a)

(b)

(a)

(b)

(a)

(b)

(a)

(b)

(a)

(b)

(a)

(b)

(a)

(b)

(a)

(b)

(a)

(b)

(a)

(b)

ESCA of polyimide particles having carboxyl groups-7

(a) Before fluorination (b) After fluorination

ESCA of BDE-BTDA (1:1) polyimide particles having no performance groups (a) Before fluorination (b) After fluorination

FUNCTIONAL POLYAMIC ACID MICROFINE PARTICLES, FUNCTIONAL POLYIMIDE MICROFINE PARTICLES, AND PROCESSES FOR THEIR PRODUCTION

FIELD OF THE INVENTION

The present invention relates to functional polyamic acid microfine particles, functional polyimide microfine particles, and processes for their production. The invention further relates to a method for qualitative analysis of the surface of polyimide microfine particles.

BACKGROUND OF THE INVENTION

Polyimides are not only favorable in mechanical properties but also satisfactory in other properties such as heat resistance, resistance to chemicals, and electric insulating properties and have, therefore, been used broadly as electrical/electronic materials, car component materials, and substitutes for metals and ceramics, among other applications.

The conventional process for synthesizing a polyimide comprises reacting a tetracarboxylic dianhydride with a diamine in a solvent such as N,N-dimethylformamide (DMF) to give a polyamic acid which is a precursor of the objective polyimide in the form of a varnish, and subjecting this varnish to precipitation to provide the objective polyimide as fine powders.

However, this technology has the drawback that the polyimide particles separating out with the progress of polymerization reaction undergo coalescence/coagulation, thus failing to give a monodispersed polyimide system.

An alternative technology comprises polymerizing a tetracarboxylic dianhydride with an organic diamine in an organic solvent to give a polyamic acid solution, pouring this solution in a poor solvent for the polymer, recovering the resulting precipitate, and subjecting it to thermal cyclization reaction to provide the objective polyimide.

However, when a microfine polyimide powder is to be produced by this technology, the polymer block must be recovered after the imidation reaction and mechanically pulverized, thus introducing a complicating factor into the production process. Moreover, mechanical pulverization yields only more or less coarse particles and can hardly provide a monodispersed system of discrete particles. In addition, the above technology does not lend itself well to the control of particle morphology and size distribution. Therefore, there has been a standing demand for development of a technology for producing a microfine polyimide powder capable of providing a monodispersed system.

Furthermore, such polyimide microfine particles with controlled shape and size distribution can be expected to find application in a variety of new uses should they be provided with various characteristics.

A primary object of the present invention, therefore, is to provide processes for producing functional polyamic acid microfine particles and functional polyimide microfine particles by which such particles can be controlled critically in particle shape and in particle size distribution. A further object of the present invention is to provide polyamic acid microfine particles and polyimide microfine particles both having good monodispersibility and carrying functional groups at least on the particle surface.

SUMMARY OF THE INVENTION

With a view to overcoming the above drawbacks of the prior art, the inventors of this invention explored in earnest for a way to accomplish the above object and discovered that the above object can be accomplished by using a process including a certain procedure herein defined. This invention has been developed on the basis of the above finding.

The present invention, therefore, is directed to the following functional polyamic acid microfine particles, functional polyimide microfine particles and processes for producing said particles.

1. A process for producing polyamic acid microfine particles having functional groups at least on the particle surface by a synthetic route starting with a tetracarboxylic anhydride and a diamine compound, said process being characterized in that it comprises
    (a) a first step which comprises providing a tetracarboxylic anhydride and a diamine compound at least one of which has said functional groups and preparing a first solution containing said tetracarboxylic anhydride and a second solution containing said diamine compound and
    (b) a second step of mixing said first and second solutions together under ultrasonic agitation to precipitate polyamic acid microfine particles from the mixed solution.

2. A process for producing polyimide microfine particles having functional groups at least on the particle surface by a synthetic route starting with a tetracarboxylic anhydride and a diamine compound, said process being characterized in that it comprises
    (a) a first step which comprises providing a tetracarboxylic anhydride and a diamine compound at least one of which has said functional groups and preparing a first solution containing said tetracarboxylic anhydride and a second solution containing said diamine compound,
    (b) a second step which comprises mixing said first and second solutions together under ultrasonic agitation to precipitate polyamic acid microfine particles from the mixed solution, and
    (c) a third step which comprises subjecting said polyamic acid microfine particles to imidation reaction to produce polyimide microfine particles.

3. Functional polyamic acid microfine particles having a mean particle diameter of 0.03~2 $\mu$m as obtained by the process defined in the above paragraph 1.

4. Functional polyimide microfine particles having a mean particle diameter of 0.03~2 $\mu$m as obtained by the process defined in the above paragraph 2.

The present invention is further directed to the following method of qualitative analysis.

5. A method for qualitative analysis of polyimide particles for functional groups on the surface by electron spectroscopy for chemical analysis (ESCA), said method being characterized in that it comprises a step of fluorinating the surface of said polyimide particles with a fluorinating agent reactive with said functional groups.

DETAILED DESCRIPTION OF THE INVENTION

Figure 1:
FIG. 1(a) is an image drawing of the polyamic acid microfine particles obtained in Example 1 and FIG. 1(b) is an image drawing of the polyimide microfine particles obtained in Example 1.
Figure 1:
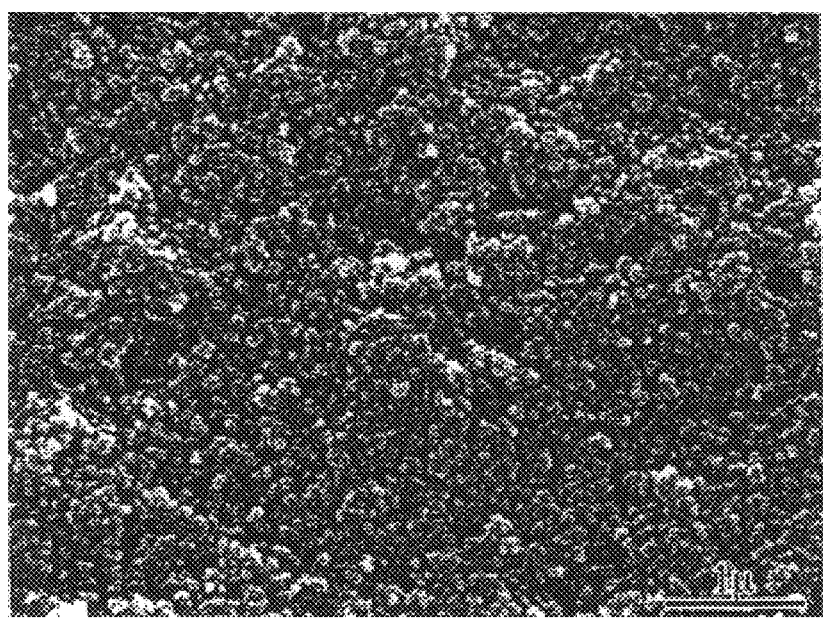

It should be understood, in the first place, that the first and second steps of said second invention are identical with the first and second steps, respectively, of said first invention. Those respective steps are now described in detail.

(1) First Step

In accordance with this invention, a tetracarboxylic anhydride and a diamine compound are used as starting materials to produce polyamic acid microfine particles. This operation is carried out using a tetracarboxylic anhydride and a diamine compound at least one of which has functional groups. The kind of functional group is not particularly restricted only if the desired performance characteristic can be imparted to the particle surface. Thus, not only various functional groups such as hydroxy (—OH), carboxy (—COOH), amino (—NH$_2$), alkene (—CH=CH—), alkine (—C≡C—), vinyl ether (—CH=CH—O—), amido(—CONH$_2$), nitrile (—C≡N), isocyanato (—N=C=O), nitro (—NO$_2$), sulfo (—SO$_3$H), thiol (—SH), crown ether and other groups but also —CF$_3$, —CCl$_3$, —CBr$_3$ —CF$_2$—, SiO$_2$— and other groups can be utilized. In the present invention, one or more species of each compound (tetracarboxylic anhydride, diamine compound) can be used. Each compound may have one or more kinds of functional group. Namely, when any one compound has two or more functional groups, these groups may be the same or different. In the present invention, suitable functional groups can be introduced into the particle surface according to the physical properties required of polyamic acid or polyimide microfine particles and the intended uses for the product particles.

Using those starting materials defined above, a first solution of said tetracarboxylic anhydride and a second solution of said diamine compound are respectively prepared in the first step. Thus, in the process of this invention, it is essential to provide the tetracarboxylic anhydride and diamine compound as two independent solutions in the first place.

(a) First solution

The tetracarboxylic anhydride which can be used for the preparation of said first solution is not particularly restricted but includes those compounds which are conventionally used in polyimide synthesis. Thus, it includes aromatic tetracarboxylic anhydrides such as 3,3',4,4'-benzophenonetetracarboxylic dianhydride (BTDA), 3,3',4,4'-biphenyltetracarboxylic dianhydride, 2,3,3',4'-biphenyltetracarboxylic dianhydride, pyromellitic dianhydride, 1,3-bis(2,3-dicarboxyphenoxy)benzene dianhydride, 1,4-bis(2,3-dicarboxyphenoxy)benzene dianhydride, 2,3,3',4'-benzophenonetetracarboxylic dianhydride, 2,2',3,3'-benzophenonetetracarboxylic dianhydride, 2,2',3,3'-biphenyltetracarboxylic dianhydride, 2,2',6,6'-biphenyltetracarboxylic dianhydride, naphthalene-1,2,4,5-tetracarboxylic dianhydride, anthracene-2,3,6,7-tetracarboxylic dianhydride, phenanthrene-1,8,9,10-tetracarboxylic dianhydride, etc.; aliphatic tetracarboxylic anhydrides such as butane-1,2,3,4-tetracarboxylic dianhydride etc.; alicyclic tetracarboxylic anhydrides such as cyclobutane-1,2,3,4-tetracarboxylic dianhydride etc.; and heterocyclic tetracarboxylic anhydrides such as-thiophene-2,3,4,5-tetracarboxylic dianhydride, pyridine-2,3,5,6-tetracarboxylic dianhydride, etc. Those compounds can be used each independently or in a combination of 2 or more different species. For the purposes of the invention, BTDA and pyromellitic dianhydride are particularly preferred.

As the tetracarboxylic anhydride having functional groups, those having any of the above-mentioned functional groups can be employed. For example, bicyclo(2.2.2)oct-7-ene-2,3,5,6-tetracarboxylic dianhydride, 2,2-bis (3,4-anhydrodicarboxyphenyl)hexafluoropropane, etc. can be used. In the present invention, such tetracarboxylic anhydrides having functional groups can be used in combination with tetracarboxylic anhydrides having no functional groups.

Furthermore, this invention can be reduced to practice by using a tetracarboxylic anhydride partially substituted by acid chloride. Such substitution with acid chloride may result in the benefits of increased reaction rate and further reduction in the particle diameter. As the acid chloride, diethyl pyromellitate diacyl chloride, for instance, can be used.

The solvent for use in the preparation of said first solution is not particularly restricted only if the tetracarboxylic anhydride is substantially soluble therein while the reaction product polyamic acid is insoluble. Thus, for example, 2-propanone, 3-pentanone, tetrahydropyrene, epichlorohydrin, acetone, methyl ethyl ketone (MEK), tetrahydrofuran (THF), ethyl acetate, acetanilide, methanol, ethanol, isopropyl alcohol, toluene, and xylene can be mentioned. Thus, a solvent comprising at least one of those solvent species can be used. Usable are even those solvents in which the polyamic acid is soluble, for example aprotic polar solvents such as N,N-dimethylformamide (DMF), N,N-dimethylacetamide (DMAc), N-metyl-2-pyrrolidone (NMP), etc. if they are mixed beforehand with a poor solvent for the polyamic acid, such as acetone, ethyl acetate, MEK, toluene, xylene, etc., or otherwise preadjusted so that the polyamic acid will be precipitated therefrom.

The concentration of the tetracarboxylic anhydride in the first solution can be judiciously selected according to the species of tetracarboxylic anhydride and the concentration of the second solution, among other factors, but is generally 0.001~0.20 mol/L and preferably about 0.01~0.10 mol/L.

(b) Second solution

The diamine compound for use in the preparation of said second solution is not particularly restricted but includes those compounds which are conventionally used in polyimide synthesis. For example, it may be any of aromatic diamines such as 4,4'-diaminodiphenylmethane (DDM), 4,4'-diaminodiphenyl ether (DPE), 4,4'-bis(4-aminophenoxy)biphenyl (BAPB), 1,4'-bis(4-aminophenoxy)benzene (TPE-Q), 1,3'-bis(4-aminophenoxy)benzene (TPE-R), o-phenylenediamine, m-phenylenediamine, p-phenylenediamine, 3,4'-diaminodiphenyl ether, 4,4'-diaminodiphenyl sulfone, 3,4-diaminodiphenyl sulfone, 3,3'-diaminodiphenyl sulfone, 4,4'-methylene-bis(2-chloroaniline), 3,3'-dimethyl-4,4'-diaminobiphenyl, 4,4'-diaminodiphenyl sulfide, 2,6'-diaminotoluene, 2,4-diamino-chlorobenzene, 1,2-diaminoanthraquinone, 1,4-diaminoanthraquinone, 3,3'-diaminobenzophenone, 3,4-diaminobenzophenone, 4,4'-diaminobenzophenone, 4,4'-diaminobibenzyl, R(+)-2,2'-diamino-1,1'-binaphthalene, S(+)-2,2'-diamino-1,1'-binaphthalene, etc.; aliphatic diamines such as 1,2-diaminomethane, 1,4-diaminobutane, tetramethylenediamine, 1,10-diaminododecane, etc.; alicyclic diamines such as 1,4-diaminocyclohexane, 1,2-diaminocyclohexane, bis(4-aminocyclohexyl)methane, 4,4'-diaminodicyclohexylmethane, etc.; 3,4-diaminopyridine, 1,4-diamino-2-butanone, etc. Those diamine compounds can be used each alone or in a combination of 2 or more species. In the practice of this invention, DPE or TPE-R, for instance, is used with particular advantage.

As said diamine compound having functional groups, diamine compounds having any of said functional groups can be employed. For example, 1,3-diamino-2-propyl alcohol (DHPr), 2,2-bis(4-aminophenyl)hexafluoropropane (BIS. A. AF), 3,5-diaminobenzoic acid (3. 5. DBA), 2,4-dimethyl-6-hydroxypyrimidine (2.4. D. 6. HP), and 2,4,6-triaminopyrimidine (2.4.6. TAPM), among others, can be used. In the present invention, such diamine compounds having functional groups can be used in combination with diamine compounds having no functional groups.

Furthermore, in addition to such diamine compounds, other amine compounds (monoamines and polyamines) can be used in the practice of this-invention. By so doing, the characteristics of the product polyamic acid or polyimide can be modified as desired.

The solvent for use in the preparation of said second solution is not particularly restricted only if the diamine compound is substantially soluble therein while the product polyamic acid is insoluble. Thus, for example, 2-propanone, 3-pentanone, tetrahydropyrene, epichlorohydrin, acetone, methyl ethyl ketone (MEK), tetrahydrofuran (THF), ethyl acetate, acetanilide, methanol, ethanol, and isopropyl alcohol can be mentioned, and solvents containing one or more of those solvents can be employed. Moreover, even those solvents in which the polyamic acid is soluble, for example aprotic polar solvents such as DMF, DMAc, NMP, etc. can also be used if they are previously mixed with a poor solvent for the polyamic acid, such as acetone, ethyl acetate, MEK, toluene, xylene, etc., or otherwise adjusted beforehand so that the polyamic acid will be precipitated therefrom.

The concentration of the diamine compound in the second solution can be judiciously selected according to the species of diamine compound and the concentration of the first solution, among other factors, but is generally about 0.001~0.20 mol/L and preferably 0.01~0.10 mol/L.

(2) Second Step

In the second step, the first solution is combined with the second solution and microfine polyamic acid particles are allowed to separate out from the mixed solution under constant ultrasonic agitation. The blending ratio of the first solution to the second solution can be adjusted according to the species of tetracarboxylic anhydride and diamine compound and the concentrations of the respective solutions but it is recommendable to blend them in a tetracarboxylic anhydride:diamine compound ratio (molar ratio) of generally about 1:0.5~1.5 and preferably 1:0.9~1.1.

This ultrasonic agitation, in the second step, enables micronization down to about 50% in mean particle diameter as compared with the usual stirring method. For this ultrasonic agitation, the known sonication equipment (e.g. an ultrasonic cleaner) and operating conditions can be used without modification. The frequency of ultrasonic waves can be judiciously set according to the desired particle diameter and other parameters and is usually about 10~100 kHz and preferably 28~45 kHz.

The temperature at which the second step is carried out is not particularly restricted but may range generally from about —100~130° C., preferably from 0~130° C., and more preferably from 20~40° C. The agitation is continued until precipitation of the polyamic acid has substantially gone to completion and its duration is generally about 30 seconds to 30 minutes, although the range is not critical.

In the second step of the invention, a poor solvent for polyamic acid can be added to the mixed solution. Depending on the solvent used for the preparation of the first solution or the second solution, the polyamic acid particles do not (or hardly) precipitate out. In that event, addition of a poor solvent for polyamic acid may result in efficient precipitation of polyamic acid microfine particles. In other words, by adding a poor solvent for polyamic acid to the mixed solution, polyamic acid particles can be precipitated while the first solution and the second solution are maintained in fluid state, with the result that performance polyamic acid particles cat be obtained with certainty.

The poor solvent to be added to the mixed solution is not particularly restricted but can be judiciously selected according to the kind of product polyamic acid and the solvents for the first and second solutions, among other factors. For example, the same poor solvents as mentioned for the first step can be employed. Thus, acetone, ethyl acetate, MEK, toluene, xylene and so on can be mentioned. Moreover, the poor solvent may be added to whichever of the solution (polyamic acid solution) after reaction of the first and second solutions and the solution or solutions before the reaction but addition to the solution or solutions before reaction is preferred.

The microfine polyamic acid particles which have precipitated out in the second step can be recovered by known solid-liquid separation means such as centrifugation. When the microfine polyamic acid particles produced in the second step consist of spherical particles, it generally forms a monodispersed system with a mean particle diameter of 0.03~2 μm (preferably 0.03~1.5 μm), a standard deviation of 0.00009~0.6 (preferably 0.00009~0.376), and a coefficient of variation within the range of 0.5~30% (preferably 2.5~25%). When the microfine partcle is formless, the mean particle size is generally about 0.1~1 μm. These polyamic acid microfine particles have functional groups at least on the particle surface. The proportion of the functional groups can be judiciously established according to the intended use for the end product and the kind of functional groups, among other factors.

(3) Third Step

In the third step, the microfine polyamic acid particles obtained in the second step are imidated to a microfine polyimide particles. The imidation technology is not particularly restricted only if microfine polyimide particles can be directly obtained from the microfine polyamic acid particles but, in this invention, it is preferable to use (i) the imidation method which comprises heating the polyamic acid particles in an organic solvent (thermal cyclization) or (ii) the method of imidation by chemical reaction in an organic solvent (chemical cyclization).

The first-mentioned thermal method typically comprises dispersing the polyamic acid particles in an organic solvent and heating the dispersion generally at a temperature not below 130° C. and preferably at about 130~250° C. The organic solvent is not particularly restricted only if it is a poor solvent for the polyamic acid and having a boiling point over the imidation reaction temperature. Particularly in this invention, the organic solvent preferably comprises a solvent capable of forming an azeotropic mixture with water (hereinafter referred to sometimes as azeotropic solvent). Thus, this invention is preferably reduced to practice using a solvent consisting, either in part or exclusively, of said azeotropic solvent. The azeotropic solvent which can be used includes but is not limited to xylene, ethylbenzene, octane, cyclohexane, diphenyl ether, nonane, pyridine, and dodecane. Those solvents can be used each alone or as a mixture of 2 or more species. In the practice of this invention, such an azeotropic solvent preferably accounts for at least 10 volume % of said organic solvent. Since the use of an azeotropic solvent enables azeotropic removal of byproduct water (mostly the water produced by condensation) by refluxing or the like, not only the hydrolysis of unreacted amide bonds can be inhibited but also the morphological alteration and molecular weight decrease can be inhibited, with the result that microfine polyimide particles capable of forming a monodispersed system is more positively obtained.

The proportion of the polyamic acid particles to be dispersed in the organic solvent can be judiciously selected according to the kind of organic solvent, among other factors, but is generally about 1~50 grams/litter and preferably 5~10 g/L.

The latter chemical reaction method can be carried into practice by the known chemical cyclization technology. A typical process comprises dispersing the microfine polyamic acid particles in an organic solvent consisting of pyridine and acetic anhydride and heating the dispersion under constant agitation generally at a temperature of about 15 ~115° C. for about 24 hours. The proportions of the two component solvents can be optimized for each production.

The microfine polyimide particles produced in the third step can be recovered by a known procedure and washed with an organic solvent such as petroleum ether, methanol, acetone, or the like.

When the microfine polyimide particles obtained by the technology of this invention consist of spherical particles, they generally form a monodispersed system with a mean particle diameter of 0.03~2 μm (preferably 0.03~1.5 μm), a standard deviation of 0.00009~0.6 (preferably 0.00009~0.376), and a coefficient of variation within the range of 2.5~30% (preferably 2.5~25%). When they consist of formless solid particles, the mean size is generally about 0.1~1 μm. The particle morphology of the polyimide particles usually traces back to the morphology of the polyamic acid particles and may assume the spherical, formless, or other form. These polyimide microfine particles have functional groups at least on the particle surface. The proportion of functional groups can be judiciously established according to end product uses and kinds of functional groups, among other factors. Method for qualitative analysis The method for qualitative surface analysis of polyimide microfine particles comprises detecting the presence of functional groups on the surface of polyimide microfine particles by ESCA, said method being characterized in that the surface of said polyimide microfine particles is fluorinated with a fluorinating agent reactive with said functional groups.

The fluorinating agent is not particularly restricted only if it is reactive with functional groups and capable of generating an organofluorine group. For example, a fluorine compound such as 2,2,2-trifluoroethanol, trifluoroacetic anhydride or the like or a solution thereof in a solvent can be used as said fluorinating agent. The concentration of the solution can be judiciously selected according to the kind of fluorine compound to be used, for instance. The degree of treating the polyimide microfine particles can also be judiciously established according to the kind of functional groups, the kind of fluorine compound and other conditions. The fluorination can be carried out by dispersing or immersing the polyimide microfine particles in the fluorinating agent or mixed or compounded with the fluorinating agent and, where necessary, heat may be applied. Other conditions can be judiciously selected according to the kind of functional group and the kind of fluorinating agent, among other factors.

More specifically, taking polyimide-microfine particles having carboxyl groups on the surface as an example, the surface fluorination can be effected by immersing the microfine particles in a mixture of hydrochloric acid and 2,2,2-trifluoroethanol and heating the system in a closed vessel. The ratio of 12 N-hydrochloric acid to 2,2,2-trifluoroethanol in the above mixed solution may usually be about 1:5~ about 20. The proportion (treatment load) of said microfine particles may usually be 1~10 weight parts relative to 100 weight parts of the mixed solution.

Furthermore, in the case of polyimide microfine particles having amino groups on the surface, the fluorination (amidation reaction) can be Accomplished by a procedure comprising sampling about 20 mg of the particles in a dry vial, adding 2 ml of trifluoroacetic anhydride thereto, allowing the mixture to stand in a closed vessel at room temperature for 30 minutes, and drying the mixture under reduced pressure at room temperature to thereby amidate the amino groups on the particle surface with the trifluoroacetic anhydride.

Furthermore, in the case of polyimide microfine particles having hydroxyl groups on the surface, the fluorination (acylation reaction) can be achieved by a procedure comprising sampling about 1 mg of the particles, adding 10 ml of trifluoroacetic anhydride and 10 ml of dichloromethane thereto, heating the mixture under nitrogen in a closed vessel at 130° C. for 2 hours, and drying it under reduced pressure at room temperature to thereby acylate the hydroxyl groups on the surface with the trifluoroacetic anhydride.

In the method for qualitative analysis according to the present invention, said fluorination reaction is followed by a known solid-liquid separation procedure, for example centrifugation, to recover the microfine particles and optionally further followed by washing with a solvent such as ethanol or acetone to neutralize the particles. Thereafter, the fluorinated polyimide particles are analyzed by ESCA. The ESCA conditions as such can be those used conventionally. The apparatus for ESCA may also be a device of known construction or a commercial analyzer.

Figure 11:
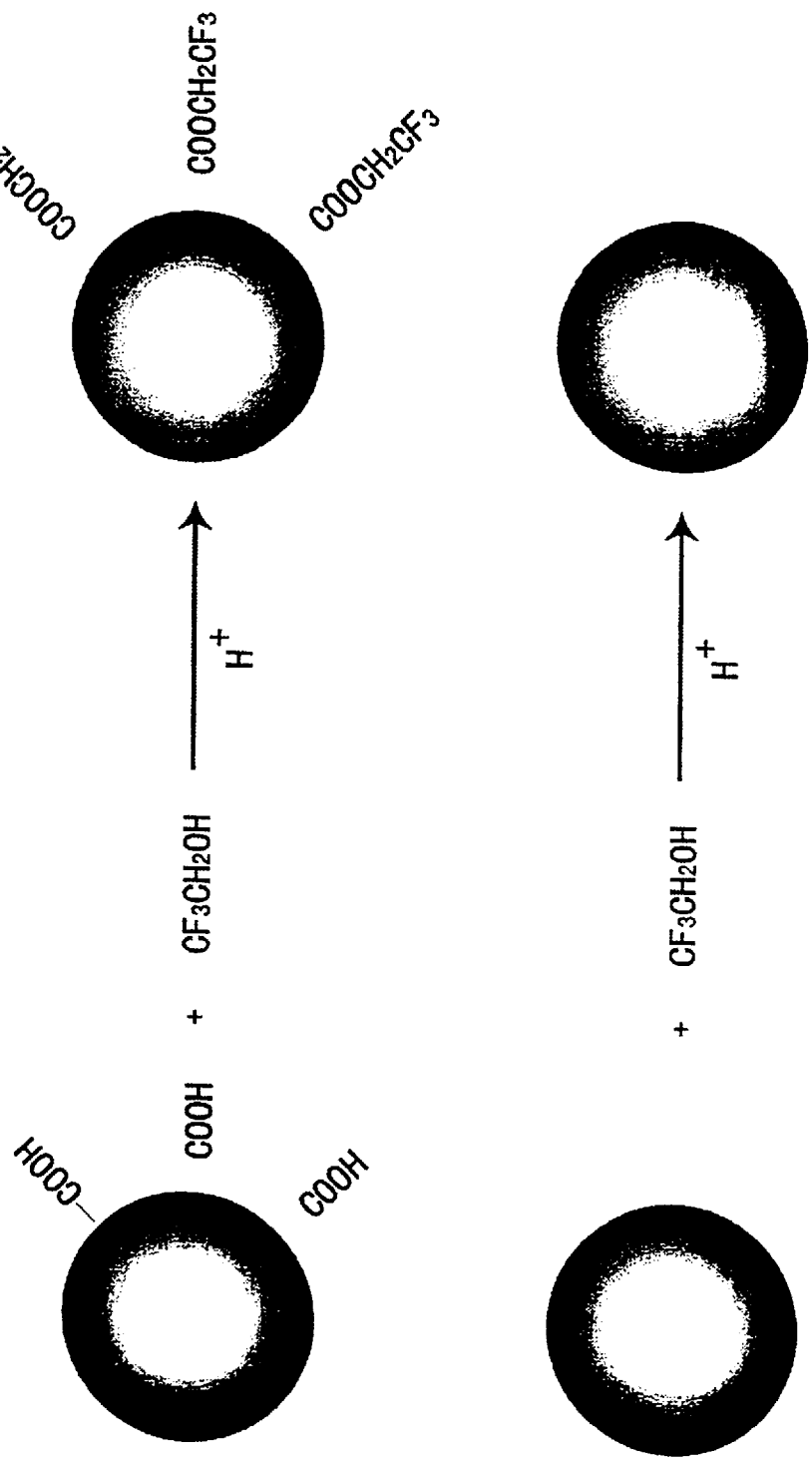
FIG. 11 is a schematic diagram of fluorination in the method for qualitative analysis according to the invention.

In the method for qualitative analysis, taking microfine particles having carboxyl groups on the surface as an example, the carboxyl group is fluorinated to —COOCH$_2$CF$_3$ (an organofluorine group) as illustrated in FIG. 11. In contrast, when microfine particles have no carboxyl groups, organofluorine groups are not formed. In this manner, polyimide particles can be quantitatively analyzed for organofluorine groups on the surface by ESCA.

When the polyimide particles initially have fluorine groups as functional groups, the particles can be qualitatively analyzed as they are without fluorination but the fluorination procedure may be carried out even in such cases.

By the method for qualitative analysis according to the present invention, particles having functional groups can be qualitatively analyzed regardless of the kinds of functional groups only if the particular functional groups can be fluorinated. Such functional groups include but are not limited to said functional groups such as hydroxy (—OH), carboxy (—COOH), amino (—NH$_2$), alkene (—CH=CH—), alkyne (—C≡C—), vinyl ether (—CH=CH—O—), amido (—CONH$_2$), nitrile (—C≡N), isocyanato (—N=C=O), nitro (—NO$_2$), sulfo (—SO$_3$H), thiol (—SH), crown ether and other groups and said —CF$_3$, —CCl$_3$, —CBr$_3$ and other groups.

In accordance with the processes of the invention, polyamic acid and polyimide microfine particles having functional groups at least on the surface can be produced efficiently and with certainty. Moreover, by the processes of the present invention, the particle size, shape and size distribution can be controlled rather easily by adjusting the production parameters judiciously.

The polyamic acid and polyimide microfine particles obtainable by the processes of the present invention have functional groups on the surface and, therefore, can be used not only in the conventional applications but also in a variety of new applications. For example, these particles are useful as electric/electronic materials, medical materials (diagnostic reagents, fluorescent markers, DDS materials, prosthetic materials, etc.), various filter materials, photonics materials, artificial monocrystal materials, chromatographic materials, industrial materials (electrode materials, electric conductor materials, etc.), spacer materials, sintering materials, film additives, composite material additives, polyimide varnish additives, polyamic acid varnish materials and so on.

By the method for qualitative analysis according to the present invention, polyimide particles can be analyzed for functional groups on the surface with comparative ease and certainty.

Furthermore, by the process of this invention, not only linear thermoplastic polyimide particles but also linear non-thermoplastic polyimide particles can be manufactured. The linear non-thermoplastic polyimide microfine particles are insoluble and infusible, showing neither Tg nor Tm, so that they express a laudable performance particularly in physical terms such as heat resistance and toughness. In other respects, they have properties basically similar to those described above for the polyamic acid microfine particles and polyimide microfine particles.

EXAMPLES

The following examples are intended to further describe the outstanding features of the invention. In the examples, the ultrasonic agitation was carried out using an Ultrasonic Cleaner CA-2481 II (Kaijo Electric Machinery Co.). The physical properties relevant to this invention were determined by the following methods.

(1) Glass transition temperature etc.

Glass transition temperature (Tg), melting temperature (Tm) and decomposition temperature (Td) were determined by differential scanning calorimetry (DSC) and thermogravimetry (TG). The DSC conditions were: rate of temperature increase 20° C./min and nitrogen 50 ml/min.

(2) Mean particle diameter etc.

The mean particle diameter of the powder was determined using a scanning electron microscope (SEM). Thus, 100 particles were randomly selected on the SEM photograph and the mean diameter of those particles was calculated by means of the following equation (1).

$$\text{Mean } X = (1/n)\Sigma Xi \qquad (1)$$

where n denotes the number of data and Xi denotes the measured value.

Based on the mean particle diameter value, the standard deviation (S) was calculated by means of the following expressions (2) and (3) and the coefficient of variation (C) by means of the following expression (4). The smaller the coefficient of variation is, the smaller is the degree of scattering of particle diameter. The mean particle diameter values and coefficients of variation shown hereinafter were determined in the same manner.

$$\text{Variance } S^2 = [1/(n-1)](\Sigma Xi^2 - X.\Sigma Xi) \qquad (2)$$

$$\text{Standard deviation } S = (S^2)^{1/2} \qquad (3)$$

$$\text{Coefficient of variation } C = (S/X) \times 100 \qquad (4)$$

(3) Structural characterization

The structure was confirmed by FT-IR.

Example 1

Polyamic acid and polyimide microfine particles having hydroxyl groups on the surface were prepared.

In the first place, a first solution (50 ml) was prepared by dissolving BTDA in acetone (BTDA/acetone =0.001 mol/50 ml; the same expression mode applies below) and a second solution was prepared by dissolving DHPr in acetone (DHPr/acetone=0.001 mol/50 ml).

These two solutions were combined at 25° C. and reacted under ultrasonic agitation at a frequency of 38 kHz for 15 minutes to let polyamic acid precipitate. Thereafter, the precipitate was recovered by centrifugation and washed with said reaction solvent (acetone).

The precipitated polyamic acid was observed with a scanning electron microscope (SEM) and confirmed to be a monodispersed powder consisting of uniform, spherical particles. The results of observation are shown in FIG. 1(a). This polyamic acid particles(powder) had a mean particle diameter of 0.088 µm with a standard deviation of 0.006, the coefficient of variation being 7.376%.

About 0.3 g of the microfine polyamic acid powder recovered was dispersed in 200 ml of xylene and the imidation reaction was carried out by refluxing the dispersion at 135° C. for about 4 hours. The imidated microfine particles were recovered by centrifugation and washed with the reaction solvent (xylene).

The resulting polyimide was observed by SEM. As a result, it was confirmed that this microfine polyimide powder also consisted of monodispersed and uniform spherical particles. The image drawing is presented in FIG. 1(b). This microfine polyimide powder had a mean particle diameter of 0.078 µm with a standard deviation of 0.006, the coefficient of variation being 7.624%. The glass transition temperature (Tg) and decomposition temperature (Td) were 201° C. and 310° C., respectively.

Example 2

Polyamic acid and polyimide microfine particles having hydroxyl groups on the surface were prepared.

Except that BTDA/acetone=0.001 mol/100 ml was used as the first solution and 2. 4. D. 6. HP/methanol=0.0004 mol/20 ml+DPE/acetone=0.0016 mol/80 ml as the second solution, the procedure of Example 1 was otherwise repeated to prepare polyamic acid microfine particles and polyimide microfine particles and the resulting particles were subjected to SEM observation as in Example 1.

Figure 2:
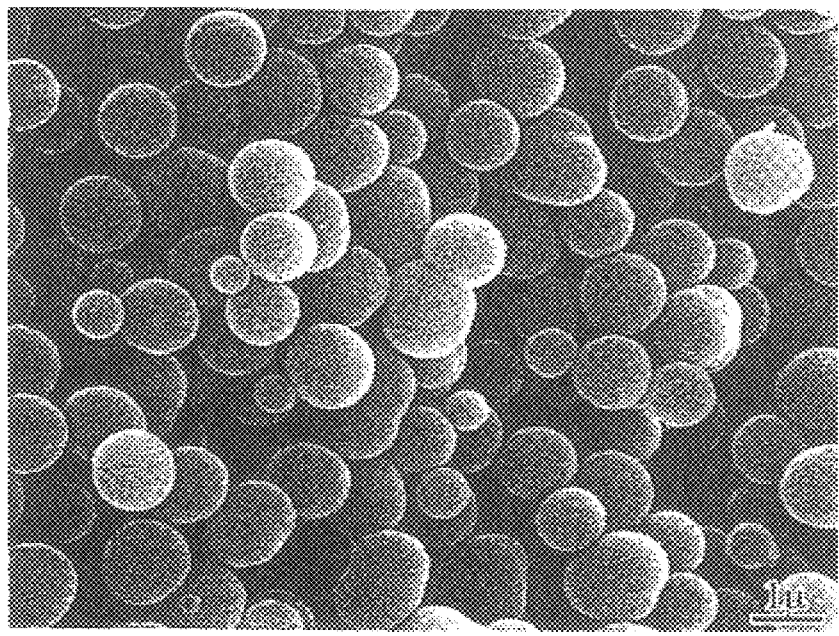
FIG. 2(a) is an image drawing of the polyamic acid microfine particles obtained in Example 2 and FIG. 2(b) is an image drawing of the polyimide microfine particles obtained in Example 2.
Figure 2:
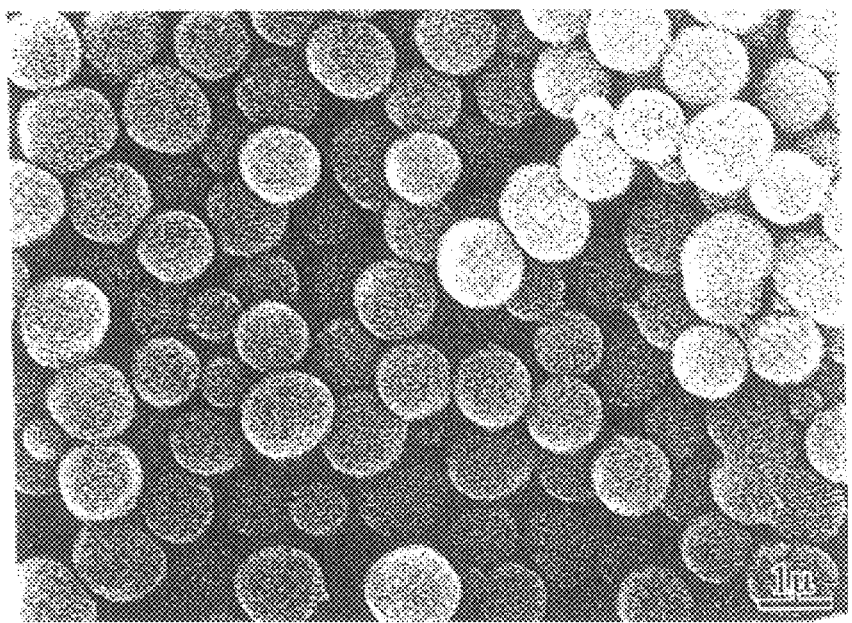

The SEM findings of the polyamic acid microfine particles are shown in FIG. 2(a). This microfine polyamic acid powder had a mean particle diameter of 1.014 µm with a standard deviation of 0.184, the coefficient of variation being 18.202%.

The SEM findings of the polyimide microfine particles obtained are shown in FIG. 2(b). This microfine polyimide powder had a mean particle diameter of 1.082 µm with a standard deviation of 0.135, the coefficient of variation being 12.502%. The glass transition temperature (Tg) and decomposition temperature (Td) were 201° C. and 310° C., respectively.

Example 3

Polyamic acid and polyimide microfine particles having carboxyl groups on the surface were prepared.

To begin with, BTDA/acetone=0.001 mol/50 ml as the first solution and 3. 5. DBA/methanol+acetone=0.0005 mol/5 ml+20 ml as the second solution and DPE/acetone=0.0005 mol/25 ml as the second solution were respectively prepared.

These solutions were combined at 25° C. and reacted under ultrasonic agitation at a frequency of 38 kHz for 10 minutes to let polyamic acid separate out. Thereafter, the precipitate was recovered by centrifugation and washed with said reaction solvent.

Figure 3:
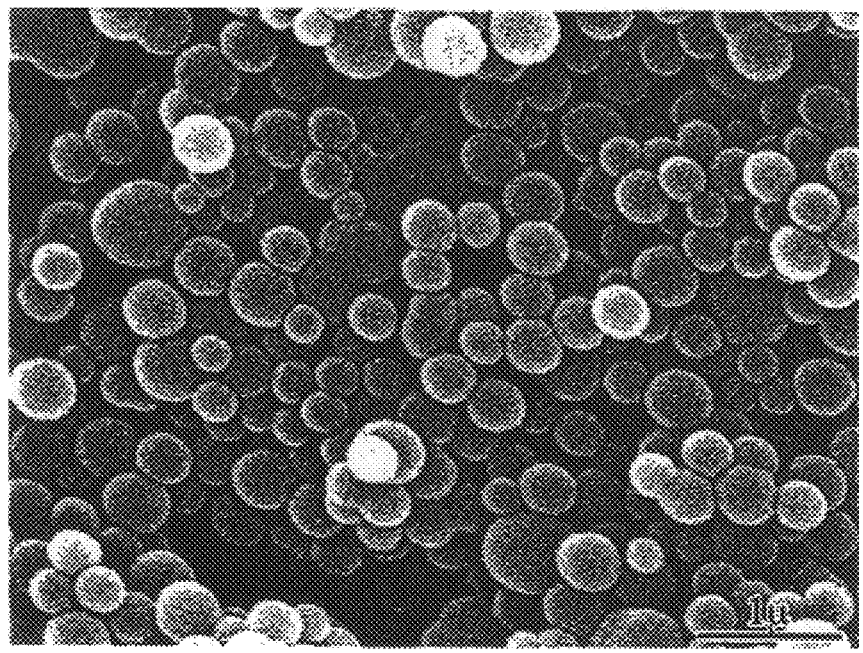
FIG. 3(a) is an image drawing of the polyamic acid microfine particles obtained in Example 3 and FIG. 3(b) is an image drawing of the polyimide microfine particles obtained in Example 3.
Figure 3:
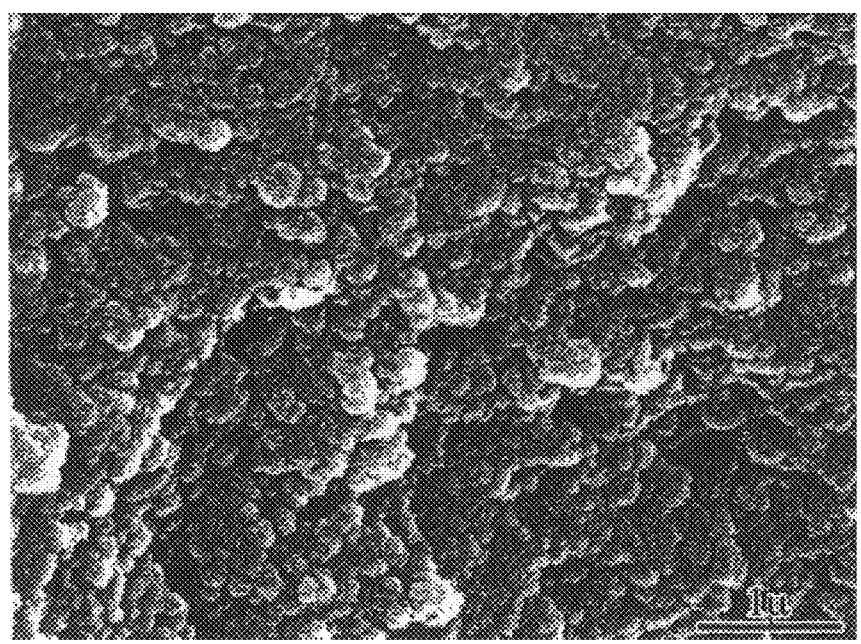

The precipitated polyamic acid was observed with a scanning electron microscope (SEM) and confirmed to be a monodispersed powder consisting of uniform, spherical particles. The results of observation are shown in FIG. 3(a). This polyamic acid powder had a mean particle diameter of 0.371 µm with a standard deviation of 0.102, the coefficient of variation being 27.480%.

About 0.3 g of the microfine polyamic powder recovered was dispersed in 200 ml of xylene and the imidation reaction was carried out by refluxing the dispersion at 135° C. for about 4 hours. The imidated microfine particles were recovered by centrifugation and washed with the reaction solvent.

The resulting polyimide was observed by SEM. As a result, it was confirmed that this microfine polyimide powder also consisted of monodispersed and uniform spherical particles. The image drawing is presented in FIG. 3(b). This microfine polyimide powder had a mean particle diameter of 0.336 µm with a standard deviation of 0.090, the coefficient of variation being 26.826%. The particles showed no glass transition point (Tg). The thermal decomposition temperature (Td) was 547° C.

Example 4

Polyamic acid and polyimide microfine particles having carboxyl groups on the surface were respectively prepared.

To begin with, BTDA/acetone =0.002 mol/100 ml as the first solution and 3. 5. DBA/methanol+acetone=0.001 mol/40 ml+10 ml as the second solution and DPE/acetone =0.002 mol/100 ml as the second solution were respectively prepared.

These solutions were combined at 25° C. and reacted under ultrasonic agitation at a frequency of 38 kHz for 10 minutes to let polyamic acid separate out. Thereafter, the precipitate was recovered by centrifugation and washed with said reaction solvent.

Figure 4:
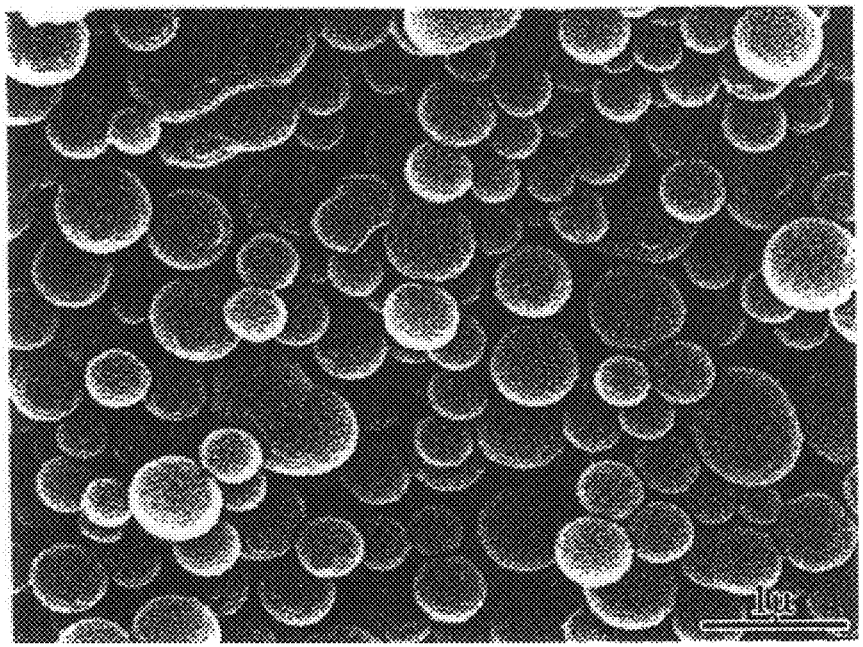
FIG. 4(a) is an image drawing of the polyamic acid microfine particles obtained in Example 4 and FIG. 4(b) is an image drawing of the polyimide microfine particles obtained in Example 4.
Figure 4:
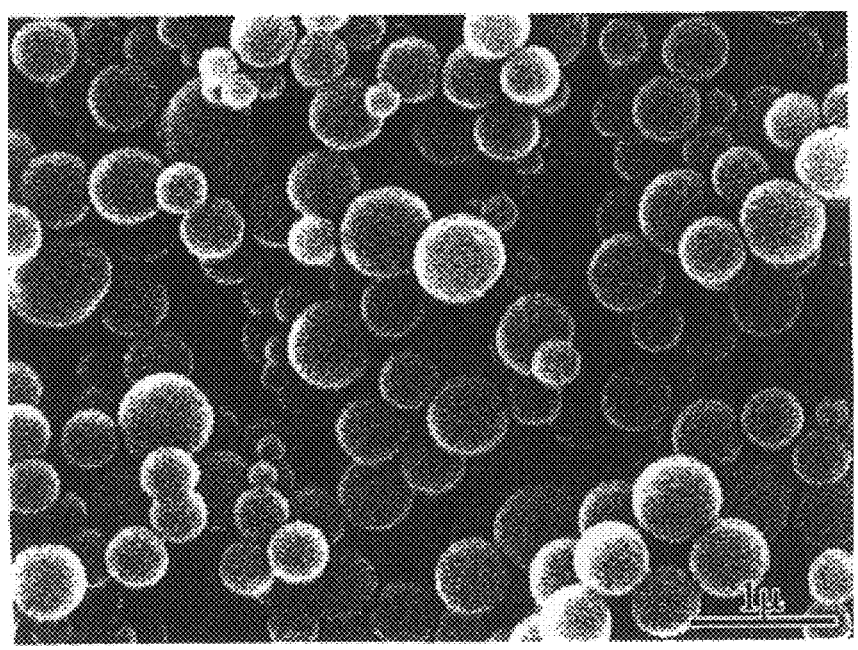

The precipitated polyamic acid was observed with a scanning electron microscope (SEM) and confirmed to be a monodispersed powder consisting of uniform, spherical particles. The results of observation are shown in FIG. 4(a). This polyamic acid powder had a mean particle diameter of 0.482 µm with a standard deviation of 0.102, the coefficient of variation being 21.151%.

About 0.3 g of the microfine polyamic acid powder recovered was dispersed in 200 ml of xylene and the imidation reaction was carried out by refluxing the dispersion at 135° C. for about 4 hours. The imidated microfine particles were recovered by centrifugation and washed with the reaction solvent.

The resulting polyimide was observed by SEM. As a result, it was confirmed that this microfine polyimide powder also consisted of monodispersed and uniform spherical particles. The image drawing is presented in FIG. 4(b). This microfine polyimide powder had a mean particle diameter of 0.470 µm with a standard deviation of 0.104, the coefficient of variation being 21.630%. The particles showed no glass transition point (Tg). The thermal decomposition temperature (Td) was 520° C.

Example 5

Polyamic acid and polyimide microfine particles both having carboxyl groups on the surface were respectively prepared.

To begin with, BTDA/acetone+xylene=0.001 mol/50 ml+50 ml as the first solution and 3. 5. DBA/NMP+acetone+xylene=0.001 mol/1 ml+49 ml+50 ml as the second solution were respectively prepared.

These two solutions were combined at 25° C. and reacted under ultrasonic agitation at a frequency of 38 kHz for 30 minutes to let polyamic acid separate out. Thereafter, the precipitate was recovered by centrifugation and washed with said reaction solvent.

Figure 5:
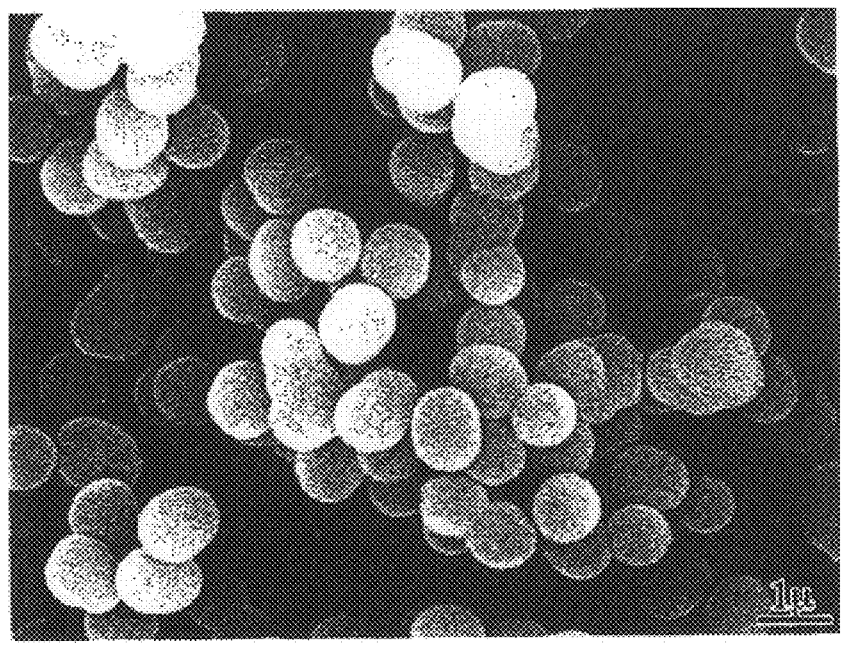
FIG. 5(a) is an image drawing of the polyamic acid microfine particles obtained in Example 5 and FIG. 5(b) is an image drawing of the polyimide microfine particles obtained in Example 5.
Figure 5:
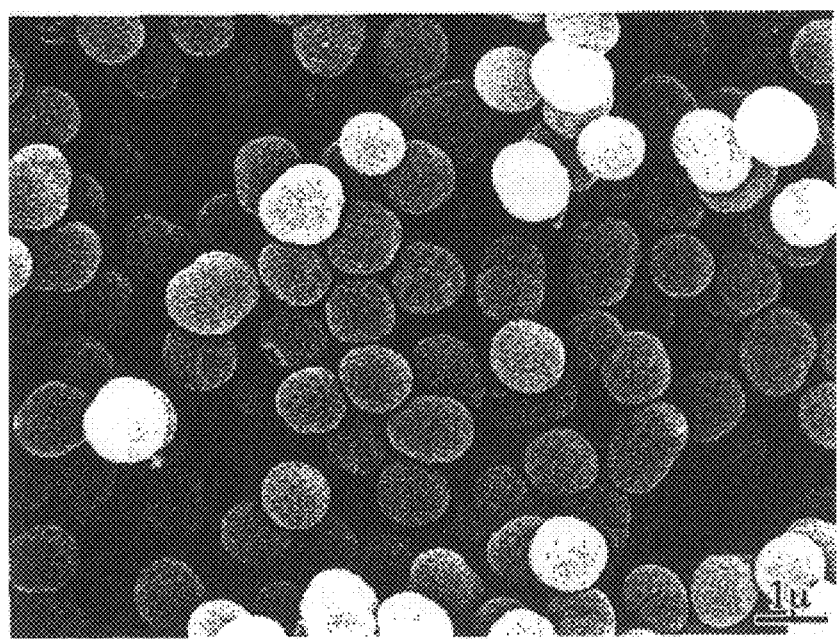

The precipitated polyamic acid was observed with a scanning electron microscope (SEM) and confirmed to be a monodispersed powder consisting of uniform, spherical particles. The results of observation are shown in FIG. 5(a). This polyamic acid powder had a mean particle diameter of 1.077 μm with a standard deviation of 0.043, the coefficient of variation being 4.034%.

About 0.3 g of the microfine polyamic acid powder recovered was dispersed in 200 ml of dodecane and the imidation reaction was carried out by refluxing the dispersion at 210° C. for about 4 hours. The imidated microfine particles were recovered by centrifugation and washed with the reaction solvent.

The resulting polyimide was observed by SEM. As a result, it was confirmed that this microfine polyimide powder also consisted of monodispersed and uniform spherical particles. The image drawing is presented in FIG. 5(b). This microfine polyimide powder had a mean particle diameter of 1.074 μm with a standard deviation of 0.045, the coefficient of variation being 4.142%. The particles showed no glass transition point (Tg). The thermal decomposition temperature (Td) was 466° C.

Example 6

Polyamic acid and polyimide microfine particles both having carboxyl groups on the surface were respectively prepared.

To begin with, BTDA/acetone+xylene=0.001 mol/50 ml+50 ml as the first solution and 3. 5. DBA/DMF+acetone+xylene=0.001 mol/1 ml+49 ml+50 ml as the second solution were respectively prepared.

These two solutions were combined at 25° C. and reacted under ultrasonic agitation at a frequency of 38 kHz for 30 minutes to let polyamic acid separate out. Thereafter, the precipitate was recovered by centrifugation and washed with said reaction solvent.

Figure 6:
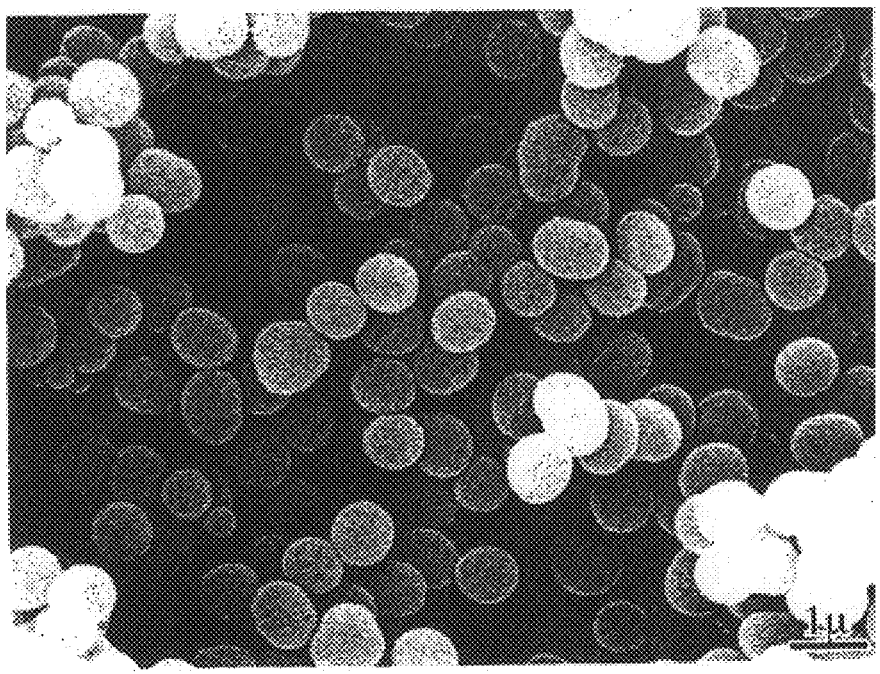
FIG. 6(a) is an image drawing of the polyamic acid microfine particles obtained in Example 6 and FIG. 6(b) is an image drawing of the polyimide microfine particles obtained in Example 6.
Figure 6:
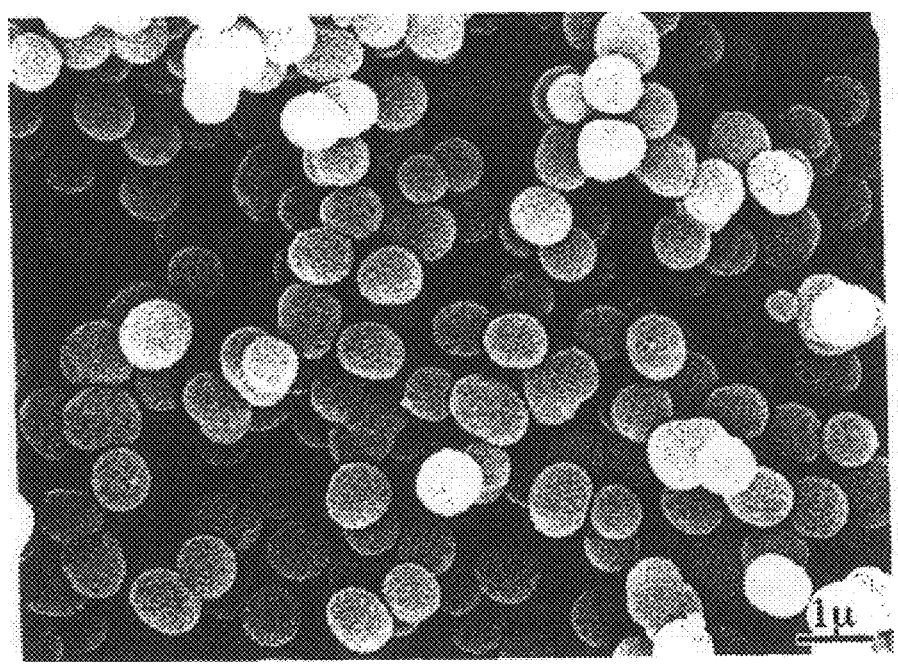

The precipitated polyamic acid was observed with a scanning electron microscope (SEM) and confirmed to be a monodispersed powder consisting of uniform, spherical particles. The results of observation are shown in FIG. 6(a). This polyamic acid powder had a mean particle diameter of 0.993 μm with a standard deviation of 0.006, the coefficient of variation being 4.800%.

About 0.3 g of the microfine polyamic acid powder recovered was dispersed in 200 ml of dodecane and the imidation reaction was carried out by refluxing the dispersion at 210° C. for about 4 hours. The imidated microfine particles were recovered by centrifugation and washed with the reaction solvent.

The resulting polyimide was observed by SEM. As a result, it was confirmed that this-microfine polyimide powder also consisted of monodispersed and uniform spherical particles. The image drawing is presented in FIG. 6(b). This microfine polyimide powder had a mean particle diameter of 0.909 μm with a standard deviation of 0.005, the coefficient of variation being 3.521%. The particles showed no glass transition point (Tg). The thermal decomposition temperature (Td) was 466° C.

Example 7

Polyamic acid and polyimide microfine particles both having carboxyl groups on the surface were respectively prepared.

To begin with, BTDA/acetone+xylene=0.001 mol/50 ml+50 ml as the first solution and 3. 5. DBA/DMAc+acetone+xylene=0.001 mol/1 ml+49 ml+50 ml as the second solution were respectively prepared.

These two solutions were combined at 25° C. and reacted under ultrasonic agitation at a frequency of 38 kHz for 30 minutes to let polyamic acid separate out. Thereafter, the precipitate was recovered by centrifugation and washed with said reaction solvent.

Figure 7:
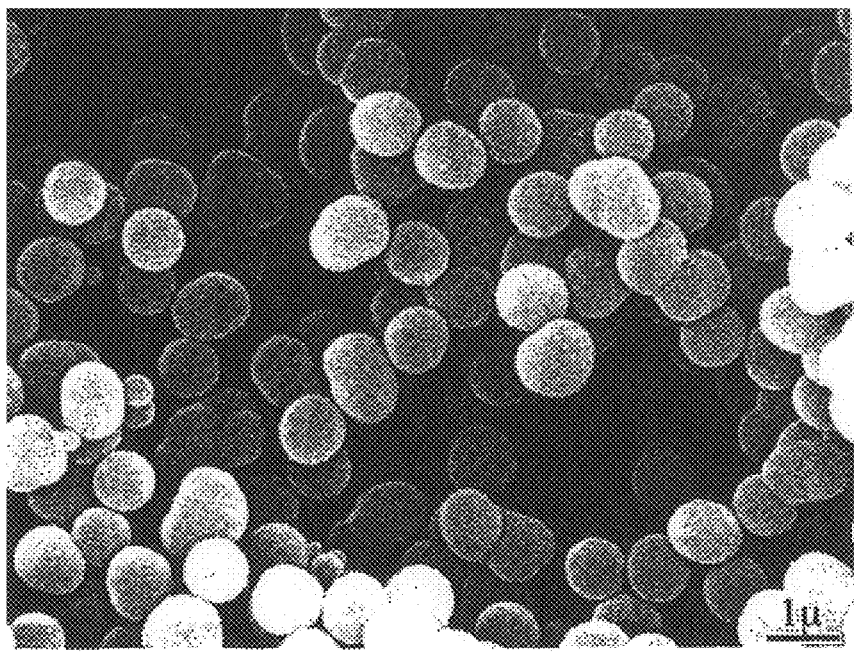
FIG. 7(a) is an image drawing of the polyamic acid microfine particles obtained in Example 7 and FIG. 7(b) is an image drawing of the polyimide microfine particles obtained in Example 7.
Figure 7:
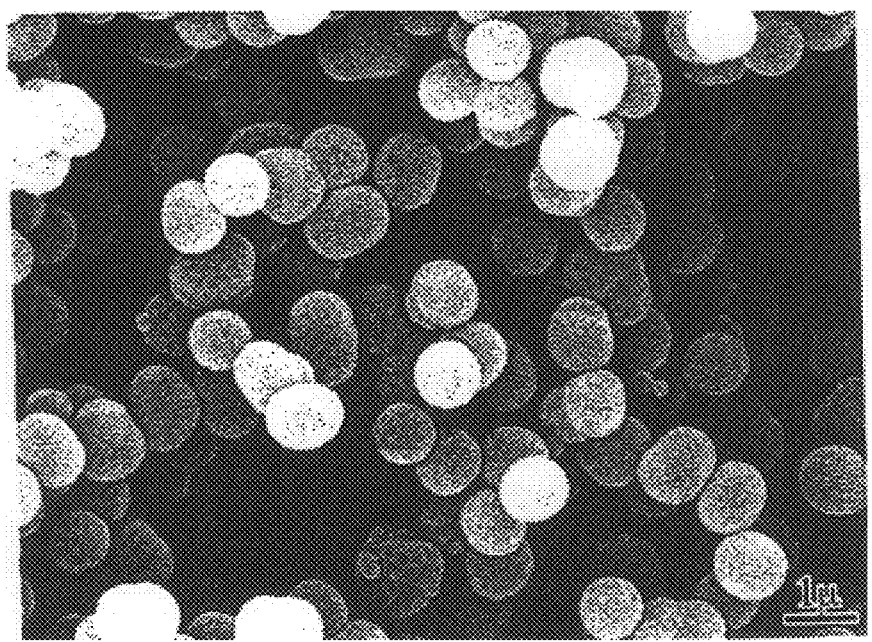

The precipitated polyamic acid was observed with a scanning electron microscope (SEM) and confirmed to be a monodispersed powder consisting of uniform, spherical particles. The results of observation are shown in FIG. 7(a). This polyamic acid powder had a mean particle diameter of 1.003 μm with a standard deviation of 0.006, the coefficient of variation being 4.358%.

About 0.3 g of the microfine polyamic acid powder recovered was dispersed in 200 ml of dodecane and the imidation reaction was carried out by refluxing the dispersion at 210° C. for about 4 hours. The imidated microfine particles were recovered by centrifugation and washed with the reaction solvent.

The resulting polyimide was observed by SEM. As a result, it was confirmed that this microfine polyimide powder also consisted of monodispersed and uniform spherical particles. The image drawing is presented in FIG. 7(b). This microfine polyimide powder had a mean particle diameter of 1.001 μm with a standard deviation of 0.006, the coefficient of variation being 4.147%. The particles showed no glass transition point (Tg). The thermal decomposition temperature (Td) was 472° C.

Example 8

Polyamic acid and polyimide microfine particles both having carboxyl groups on the surface were respectively prepared.

To begin with, BTDA/acetone+xylene=0.001 mol/50 ml+50 ml as the first solution and 3. 5. DBA/DMAc+acetone+xylene=0.0003 mol/0.3 ml+14.7 ml+15 ml as the second solution and DPE/acetone+xylene=0.0007 mol/35 ml+35 ml as the second solution were respectively prepared.

These two solutions were combined at 25° C. and reacted under ultrasonic agitation at a frequency of 38 kHz for 30 minutes to let polyamic acid separate out. Thereafter, the precipitate was recovered by centrifugation and washed with said reaction solvent.

Figure 8:
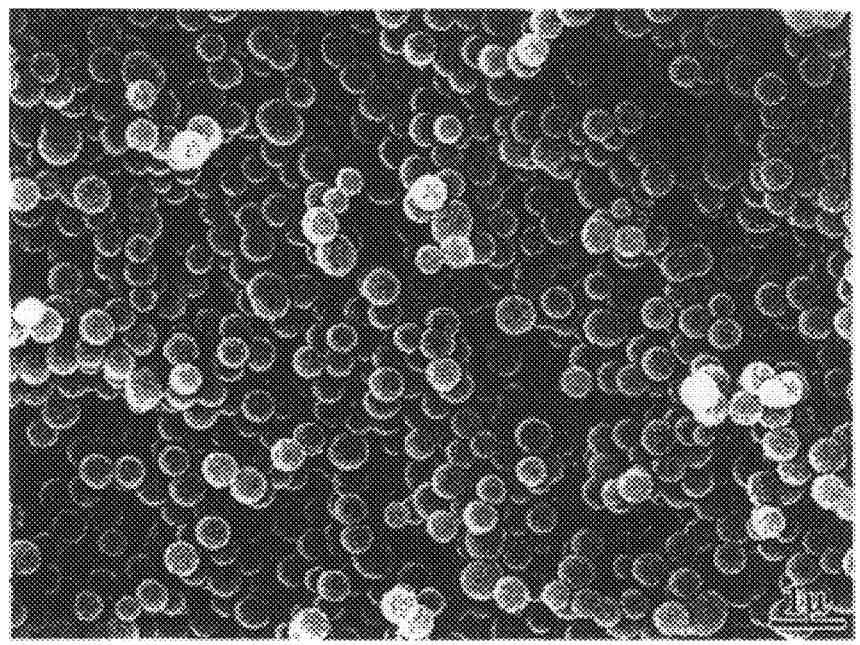
FIG. 8(a) is an image drawing of the polyamic acid microfine particles obtained in Example 8 and FIG. 8(b) is an image drawing of the polyimide microfine particles obtained in Example 8.
Figure 8:
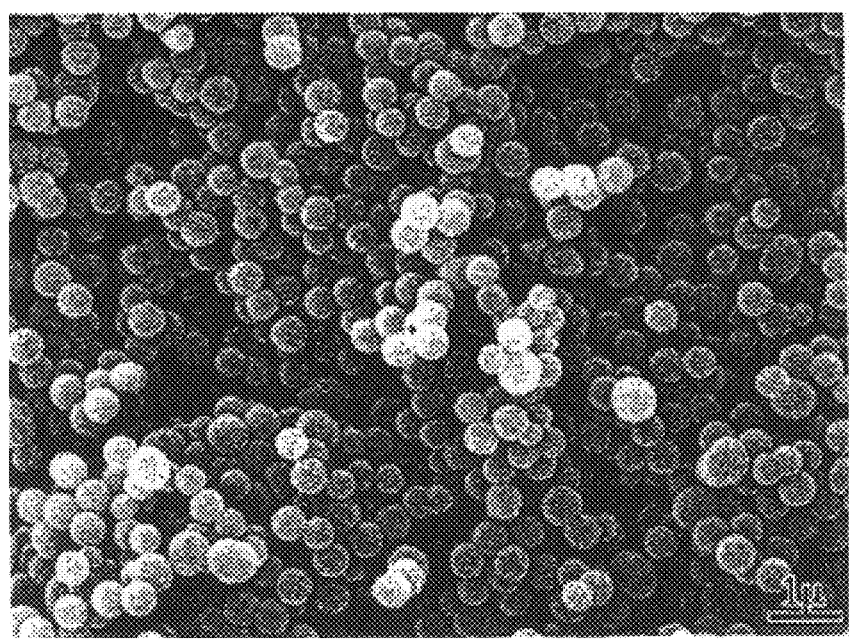

The precipitated polyamic acid was observed with a scanning electron microscope (SEM) and confirmed to be a monodispersed powder consisting of uniform, spherical particles. The results of observation are shown in FIG. 8(a). This polyamic acid powder had a mean particle diameter of 0.492 μm with a standard deviation of 0.004, the coefficient of variation being 5.990%.

About 0.3 g of the microfine polyamic acid powder recovered was dispersed in 200 ml of dodecane and the imidation reaction was carried out by refluxing the dispersion at 210° C. for about 4 hours. The imidated microfine particles were recovered by centrifugation and washed with the reaction solvent.

The resulting polyimide was observed by SEM. As a result, it was confirmed that this microfine polyimide powder also consisted of monodispersed and uniform spherical particles. The image drawing is presented in FIG. 8(b). This microfine polyimide powder had a mean particle diameter of 0.493 μm with a standard deviation of 0.004, the coefficient of variation being 6.180%. The glass transition temperature (Tg) and decomposition temperature (Td) were 310° C. and 540° C., respectively.

Example 9

Polyamic acid and polyimide microfine particles both having amino groups on the surface were respectively prepared.

To begin with, BTDA/acetone=0.002 mol/100 ml as the first solution and 2. 4. 6. TAPM/methanol+acetone=0.0004 mol/2 ml+18 ml as the second solution and DPE/acetone= 0.0016 mol/80 ml as the second solution were respectively prepared.

These two solutions were combined at 25° C. and reacted under ultrasonic agitation at a frequency of 38 kHz for 10 minutes to let polyamic acid separate out. Thereafter, the precipitate was recovered by centrifugation and washed with said reaction solvent.

Figure 9:
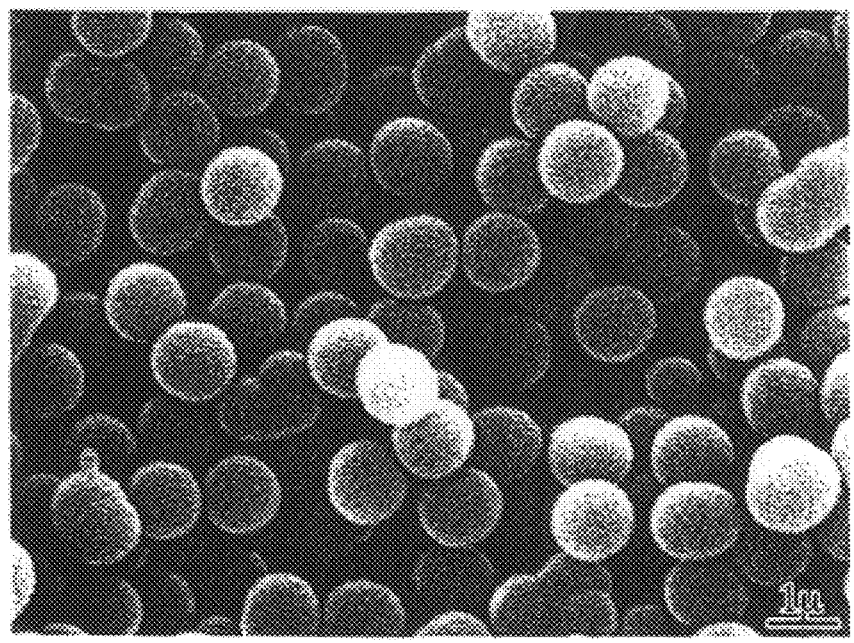
FIG. 9(a) is an image drawing of the polyamic acid microfine particles obtained in Example 9 and FIG. 9(b) is an image drawing of the polyimide microfine particles obtained in Example 9.
Figure 9:
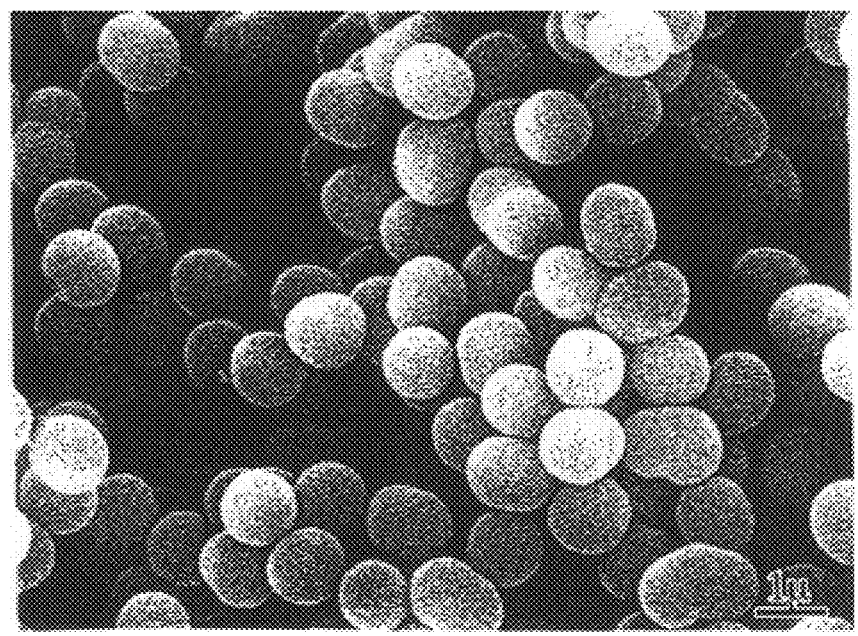

The precipitated polyamic acid was observed with a scanning electron microscope (SEM) and confirmed to be a monodispersed powder consisting of uniform, spherical particles. The results of observation are shown in FIG. 9(a). This polyamic acid powder had a mean particle diameter of 1.135 μm with a standard deviation of 0.050, the coefficient of variation being 4.474%.

About 0.3 g of the microfine polyamic acid powder recovered was dispersed in 200 ml of xylene and the imidation reaction was carried out by refluxing the dispersion at 135° C. for about 4 hours. The imidated microfine particles were recovered by centrifugation and washed with the reaction solvent.

The resulting polyimide was observed by SEM. As a result, it was confirmed that this microfine polyimide powder also consisted of monodispersed and uniform spherical particles. The image drawing is presented in FIG. 9(b). This microfine polyimide powder had a mean particle diameter of 1.112 μm with a standard deviation of 0.046, the coefficient of variation being 4.151%. The glass transition temperature (Tg) and decomposition temperature (Td) were 310° C. and 548° C., respectively.

Example 10

Polyamic acid and polyimide microfine particles both having —$CF_3$ on the surface were respectively prepared.

To begin with, BTDA/acetone+xylene=0.001 mol/20 ml+30 ml as the first solution and BIS. A. AF/acetone+xylene=0.001 mol/1 ml+49 ml as the second solution were respectively prepared.

These two solutions were combined at 25° C. and reacted under ultrasonic agitation at a frequency of 38 kHz for 30 minutes to let polyamic acid precipitate. Thereafter, the precipitate was recovered by centrifugation and washed with said reaction solvent.

Figure 10:
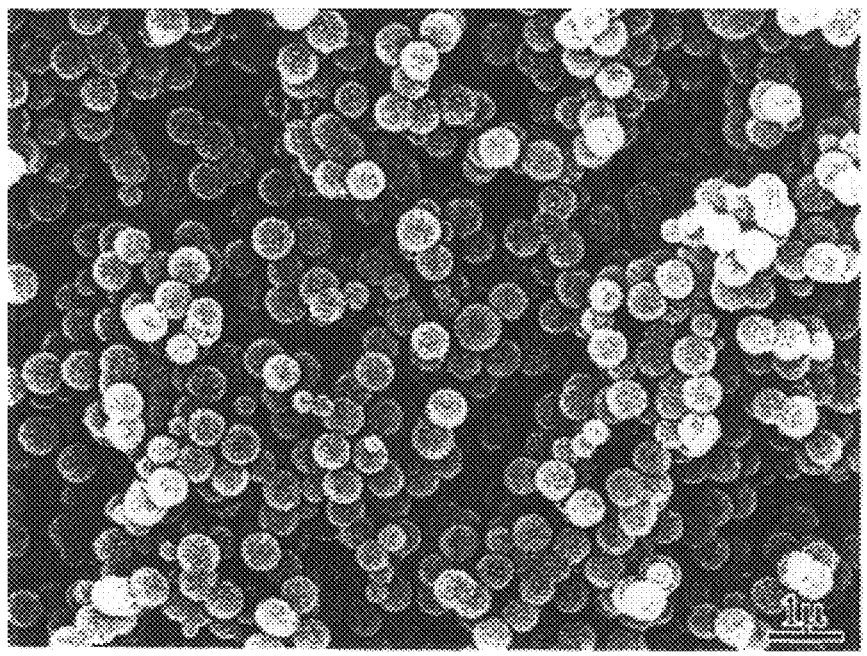
FIG. 10(a) is an image drawing of the polyamic acid microfine particles obtained in Example 10 and FIG. 10(b) is an image drawing of the polyimide microfine particles obtained in Example 10.
Figure 10:
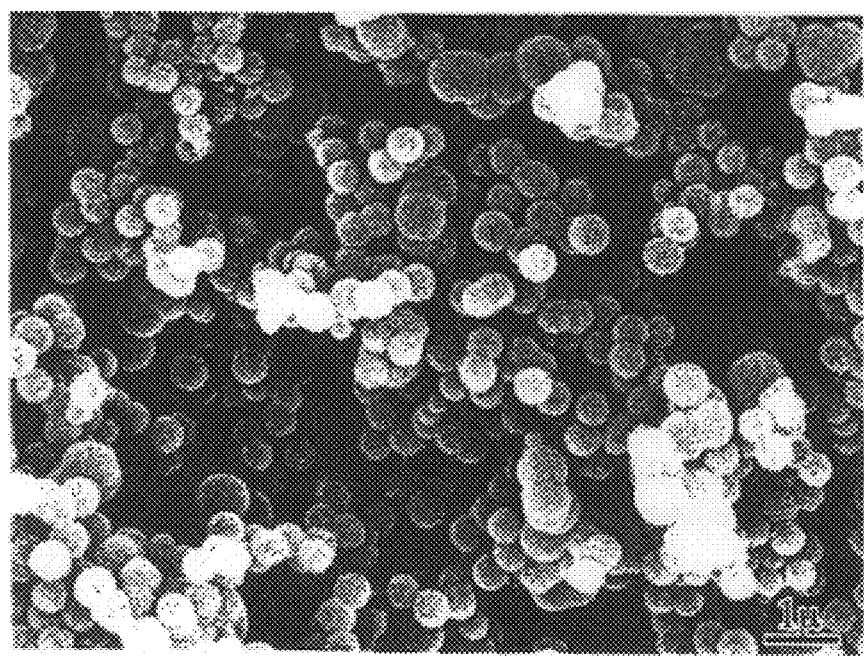

The precipitated polyamic acid was observed with a scanning electron microscope (SEM) and confirmed to be a monodispersed powder consisting of uniform, spherical particles. The results of observation are shown in FIG. 10(a). This polyamic acid powder had a mean particle diameter of 0.548 μm with a standard deviation of 0.048, the coefficient of variation being 8.681%.

About 0.3 g of the microfine polyamic acid powder recovered was dispersed in 200 ml of xylene and the imidation reaction was carried out by refluxing the dispersion at 135° C. for about 4 hours. The imidated microfine particles were recovered by centrifugation and washed with the reaction solvent.

The resulting polyimide was observed by SEM. As a result, it was confirmed that this microfine polyimide powder also consisted of monodispersed and uniform spherical particles. The image drawing is presented in FIG. 10(b). This microfine polyimide powder had a mean particle diameter of 0.512 μm with a standard deviation of 0.049, the coefficient of variation being 9.499%. The glass transition temperature (Tg) and decomposition temperature (Td) were 325° C. and 508° C., respectively.

Test Example 1

The polyimide microfine particles obtained in Example 4 were analyzed for functional groups on the surface by the method for qualitative analysis according to the invention.

Thus, 20 mg of the above polyimide microfine particles were added to a mixture of 1.2 ml of concentrated hydrochloric acid and 12 ml of 2,2,2-trifluoroethanol and the fluorination reaction was conducted in a closed vessel at 100° C. for 1 hour. The microfine particles were then recovered by centrifugation and washed to neutral with ethanol and acetone. The thus-fluorinated polyimide microfine particles were analyzed by ESCA to confirm the presence of the functional groups on the surface. As the ESCA analyzer, "ESCA 3300s" manufactured by Shimadzu Corporation was used.

Figure 12:
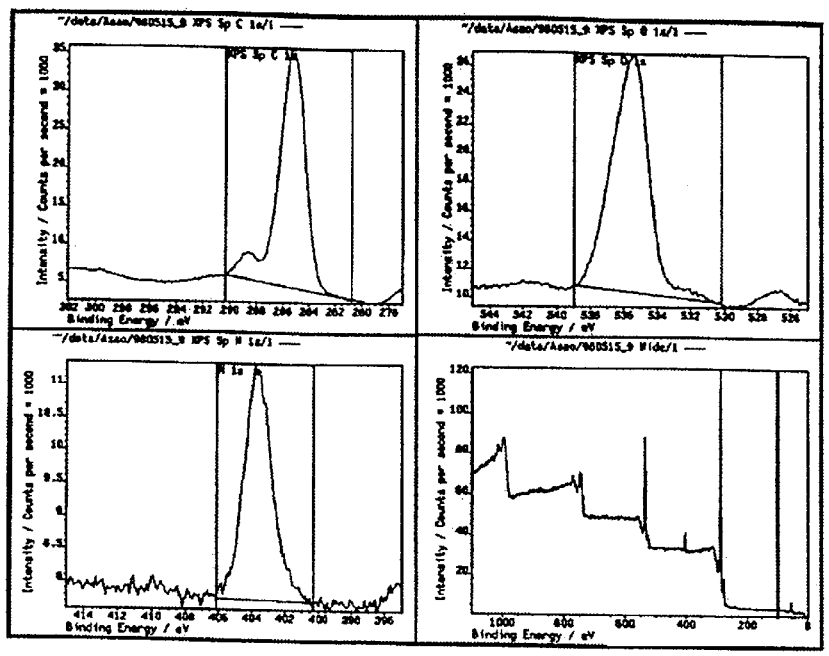
FIG. 12(a) is a diagram showing results of the ESCA analysis performed before fluorination of the polyimide microfine particles according to the invention and FIG. 12(b) is a diagram showing results of the ESCA analysis performed after fluorination of the polyimide microfine particles according to the invention.
Figure 12:
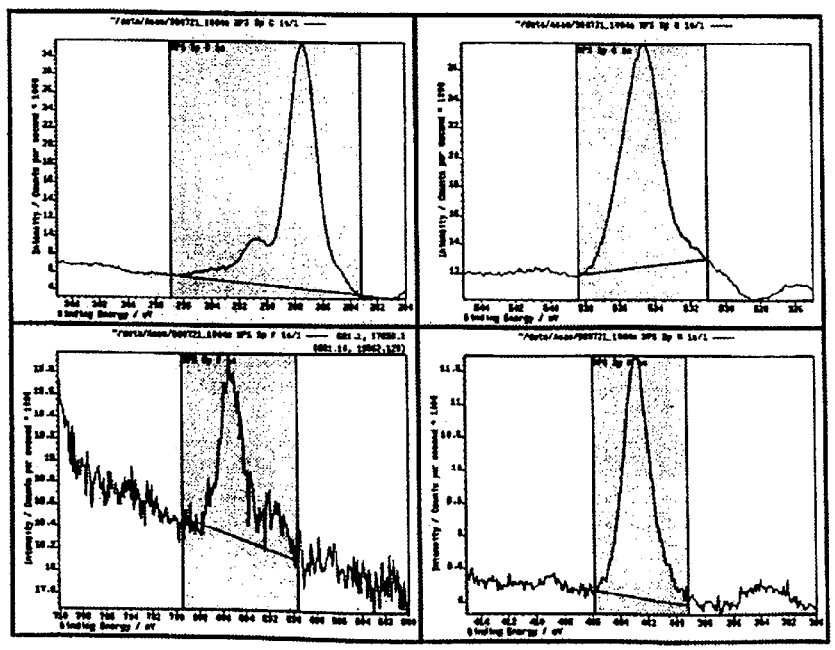

The results of the above analysis are shown in FIG. 12(b). For comparison, the results of the ESCA analysis performed before the fluorination treatment are shown in FIG. 12(a). Comparison of the two sets of data indicates the presence of carboxyl groups as functional groups on the surface of the polyimide microfine particles obtained in Example 4 as can be seen from the peak of binding energy of 1s due to organofluorine at about 695 eV in FIG. 12(b).

Test Example 2

Polyimide microfine particles having no functional groups were analyzed by the same procedure for qualitative analysis as used in Test Example 1.

Figure 13:
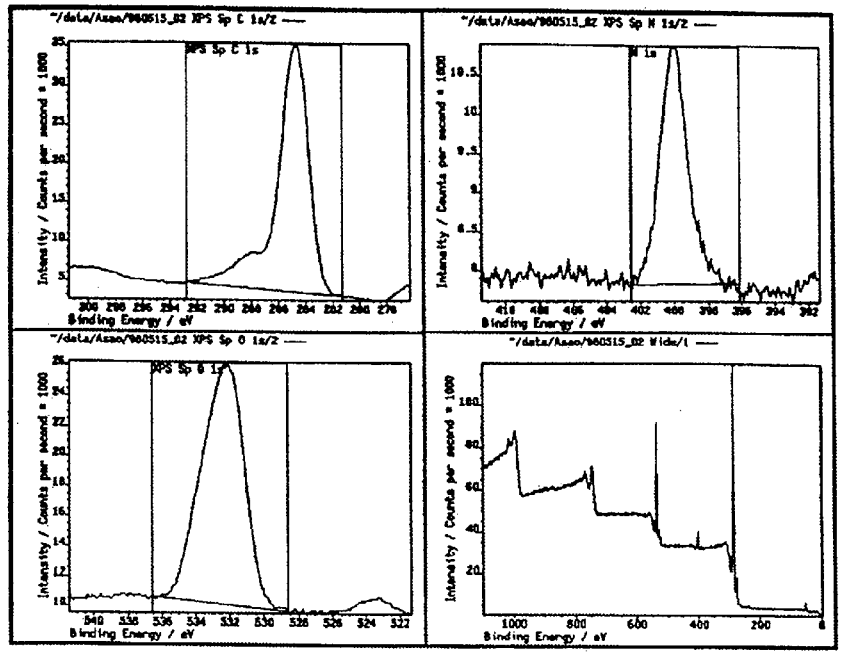
FIG. 13(a) is a diagram showing results of the ESCA analysis performed before fluorination of polyimide microfine particles carrying no functional groups and FIG. 13(b) is a diagram showing results of the ESCA analysis performed after fluorination of the polyimide microfine particles carrying no functional groups.
Figure 13:
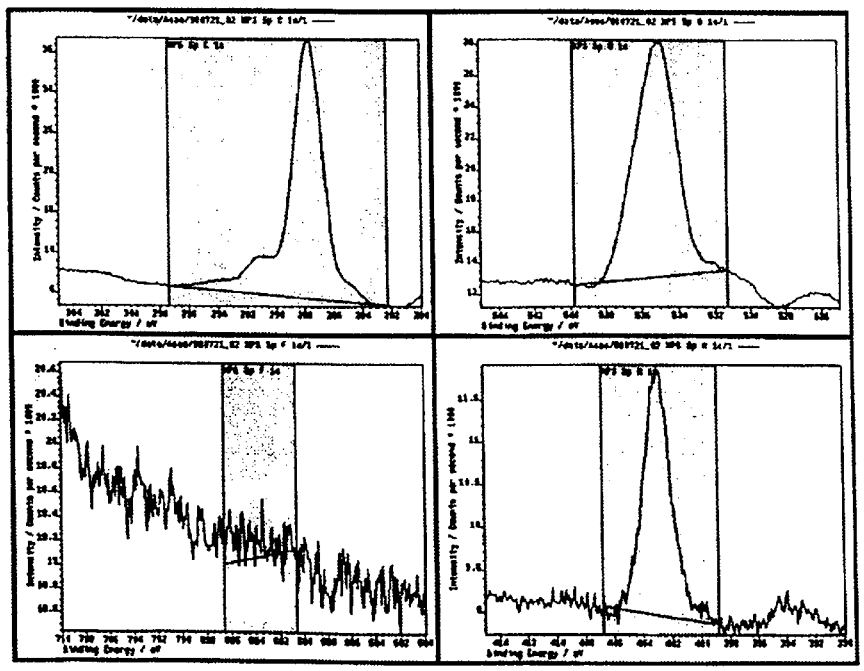

The results of the ESCA analysis performed before the fluorination treatment are shown in FIG. 13(a) and the results of the same analysis performed after fluorination are shown in FIG. 13(b). Comparison of the two sets of data indicate no difference between the data before fluorination and the data after fluorination as demonstrated by the absence of a peak of binding energy of 1s due to organofluorine even after the fluorination treatment.

The polyimide microfine particles mentioned just above were prepared by using BTDA as tetracarboxylic anhydride and DPE as diamine compound but otherwise under the same conditions as in example 1.

What is claimed is:

1. A process for producing polyamic acid microfine particles having functional groups at least on the surface by a synthetic route starting with a tetracarboxylic anhydride and a diamine compound, said process being characterized in that it comprises
   (a) a first step which comprises providing a tetracarboxylic anhydride and a diamine compound at least one of which has said functional groups, preparing a first solution containing said tetracarboxylic anhydride and a second solution containing said diamine compound and
   (b) a second step which comprises mixing said first and second solutions together under ultrasonic agitation to precipitate polyamic acid microfine particles from the mixed solution.

2. A process producing polyimide microfine particles having functional groups at least on the particle surface by a synthetic route starting with a tetracarboxylic anhydride and a diamine compound, said process being characterized in that it comprises
   (a) a first step which comprises providing a tetracarboxylic anhydride and a diamine compound at least one of which has said functional groups and preparing a first solution containing said tetracarboxylic anhydride and a second solution containing said diamine compound, (b) a second step which comprises mixing said first and second solutions together under ultrasonic agitation to precipitate polyamic acid microfine particles from the mixed solution, and (c) a third step which comprises subjecting said polyamic acid microfine particles to imidation reaction to produce polyimide microfine particles.

3. The process of claim 1 wherein the second step further comprises adding a poor solvent for the polyamic acid.

4. The process of claim 2 wherein the second step further comprises adding a poor solvent for the polyamic acid.

5. The process of claim 1 wherein the solvent for the first solution contains at least one member selected from among 2-propanone, 3-pentanone, tetrahydropyrene, epichlorohydrin, acetone, methyl ethyl ketone, tetrahydrofuran, ethyl acetate, acetanilide, methanol, ethanol, isopropyl alcohol, N,N-dimethylformamide, N,N-dimethylacetamide and N-methyl-2-pyrrolidone.

6. The process of claim 2 wherein the solvent for the first solution contains at least one member selected from among 2-propanone, 3-pentanone, tetrahydropyrene, epichlorohydrin, acetone, methyl ethyl ketone, tetrahydrofuran, ethyl acetate, acetanilide, methanol, ethanol, isopropyl alcohol, N,N-dimethylformamide, N,N-dimethylacetamide and N-methyl-2-pyrrolidone.

7. The process of claim 1 wherein the solvent for the second solution contains at least one member selected from among 2-propanone, 3-pentanone, tetrahydropyrene, epichlorohydrin, acetone, methyl ethyl ketone, tetrahydrofuran, ethyl acetate, acetanilide, methanol, ethanol, isopropyl alcohol, N,N-dimethylformamide, N,N-dimethylacetamide and N-methyl-2-pyrrolidone.

8. The process of claim 2 wherein the solvent for the second solution contains at least one member selected from among 2-propanone, 3-pentanone, tetrahydropyrene, epichlorohydrin, acetone, methyl ethyl ketone, tetrahydrofuran, ethyl acetate, acetanilide, methanol, ethanol, isopropyl alcohol, N,N-dimethylformamide, N,N-dimethylacetamide and N-methyl-2-pyrrolidone.

9. The process of claim 2 wherein the imidation of polyamic acid microfine particles in the third step comprises heating the particles in an organic solvent.

10. The process of claim 2 wherein the imidation of the polyamic acid microfine particles in the third step comprises heating the particles in a solvent containing an organic solvent forming an azeotropic mixture with water, with byproduct water being constantly removed from the reaction system.

11. The process of claim 9 wherein the heating in a solvent in the third step is carried out at 130~250° C.

12. Polyamic acid microfine particles having functional groups at least on the surface obtainable by the process of claim 1 and having a mean particle diameter of 0.03~2 $\mu$m.

13. Polymide microfine particles having functional groups at least on the surface obtainable by the process of claim 2 and having a mean particle diameter of 0.03~2 $\mu$m.

14. A method for the qualitative analysis of polymide microfine particles for functional groups on the surface by ESCA, said method being characterized in that the surface of the polymide particle is fluorinated with a fluorinating agent that reacts with said functional groups.

* * * * *